(12) United States Patent
Itsumi et al.

(10) Patent No.: US 10,689,216 B2
(45) Date of Patent: Jun. 23, 2020

(54) INSPECTION DEVICE AND INSPECTION METHOD

(71) Applicant: KABUSHIKI KAISHA TOSHIBA, Minato-ku (JP)

(72) Inventors: Kazuhiro Itsumi, Koto (JP); Yasuharu Hosono, Kawasaki (JP); Tomio Ono, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/125,008

(22) Filed: Sep. 7, 2018

(65) Prior Publication Data

US 2019/0283995 A1 Sep. 19, 2019

(30) Foreign Application Priority Data

Mar. 15, 2018 (JP) .................... 2018-048600

(51) Int. Cl.
*B65H 7/12* (2006.01)
*G01N 29/04* (2006.01)
*G01N 29/34* (2006.01)

(52) U.S. Cl.
CPC ............ *B65H 7/12* (2013.01); *G01N 29/041* (2013.01); *G01N 29/348* (2013.01); *B65H 2553/30* (2013.01); *B65H 2701/1912* (2013.01)

(58) Field of Classification Search
CPC .............................. B65H 7/12; B65H 2553/30
See application file for complete search history.

(56) References Cited

U.S. PATENT DOCUMENTS

| 7,654,522 B2* | 2/2010 | Tonami .................. B65H 7/125 |
| | | 271/262 |
| 9,465,021 B2* | 10/2016 | Schulz ................... B65H 7/125 |
| 2008/0203654 A1 | 8/2008 | Chujo et al. |
| 2012/0061901 A1 | 3/2012 | Yamamoto et al. |
| 2019/0088710 A1 | 3/2019 | Itsumi et al. |

FOREIGN PATENT DOCUMENTS

| JP | 9-269216 | 10/1997 |
| JP | 2007-292554 | 11/2007 |
| JP | 2008-207885 | 9/2008 |
| JP | 2017-174209 | 9/2017 |
| JP | 2019-57804 A | 4/2019 |
| WO | WO 2008/081183 A1 | 7/2008 |

* cited by examiner

*Primary Examiner* — Thomas A Morrison
(74) *Attorney, Agent, or Firm* — Oblon, McClelland, Maier & Neustadt, L.L.P.

(57) ABSTRACT

According to one embodiment, an inspection device includes a transmitter, a receiver, a feeder, and a processor. The transmitter emits an ultrasonic wave. The feeder causes an inspection object to move relative to the transmitter and the receiver in a space between the transmitter and the receiver. The processor processes a received signal corresponding to the ultrasonic wave obtained by the receiver. In a first state in which the inspection object includes a first region and a second region, the first region includes a foreign object, and the second region does not include the foreign object. The received signal includes a first signal level in a first interval, a second signal level in a second interval, and a third signal level in a third interval. The processor detects the foreign object by detecting at least one extreme value occurring in the received signal in a fourth interval.

13 Claims, 3 Drawing Sheets

INSPECTION DEVICE AND INSPECTION METHOD

CROSS-REFERENCE TO RELATED APPLICATIONS

This application is based upon and claims the benefit of priority from Japanese Patent Application No. 2018-048600, filed on Mar. 15, 2018; the entire contents of which are incorporated herein by reference.

FIELD

Embodiments described herein relate generally to an inspection device and an inspection method.

BACKGROUND

For example, an ultrasonic wave transceiver is used to inspect a paper-like sheet such as a banknote, etc. There are cases where a foreign object such as tape for repairing or the like is adhered to the paper-like sheet. It is desirable to be able to detect such a foreign object with high accuracy.

DETAILED DESCRIPTION

Figure 1:
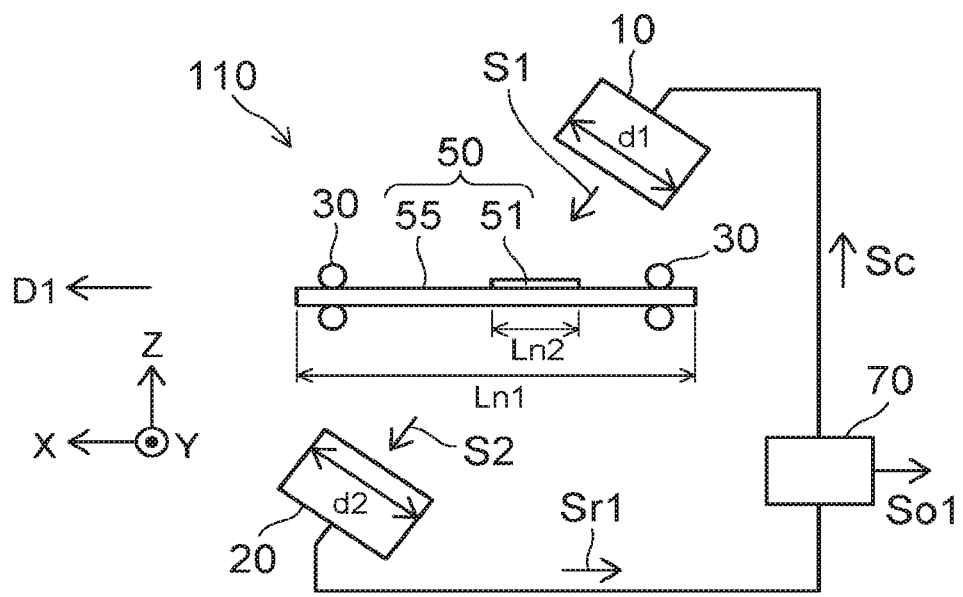
FIG. 1 is a schematic side view illustrating an inspection device according to a first embodiment.

According to one embodiment, an inspection device includes a transmitter, a receiver, a feeder, and a processor. The transmitter emits an ultrasonic wave. The feeder causes an inspection object to move relative to the transmitter and the receiver in a space between the transmitter and the receiver. The processor processes a received signal corresponding to the ultrasonic wave obtained by the receiver. In a first state in which the inspection object includes a first region and a second region, the first region includes a foreign object, and the second region does not include the foreign object. The received signal includes a first signal level in a first interval when at least a portion of the first region passes through the space, a second signal level in a second interval when at least a portion of the second region passes through the space, and a third signal level in a third interval when the inspection object does not pass through the space. The processor detects the foreign object by detecting at least one extreme value occurring in the received signal in a fourth interval between the first interval and the second interval.

According to another embodiment, an inspection method is disclosed. The method can include emitting an ultrasonic wave from a transmitter toward a receiver, causing an inspection object to move relative to the transmitter and the receiver in a space between the transmitter and the receiver, and processing a received signal corresponding to the ultrasonic wave obtained by the receiver. In a first state in which the inspection object includes a first region and a second region, the first region includes a foreign object, and the second region does not include the foreign object. The received signal includes a first signal level in a first interval when at least a portion of the first region passes through the space, a second signal level in a second interval when at least a portion of the second region passes through the space, and a third signal level in a third interval when the inspection object does not pass through the space. The method can include detecting the foreign object by detecting at least one extreme value occurring in the received signal in a fourth interval between the first interval and the second interval.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic side view illustrating an inspection device according to a first embodiment.

As shown in FIG. 1, the inspection device 110 according to the embodiment includes a transmitter 10, a receiver 20, a feeder 30, and a processor 70.

The transmitter 10 emits an ultrasonic wave S1. In one example, the frequency of the ultrasonic wave S1 is 20 kHz or more. The receiver 20 is provided to oppose the transmitter 10.

An inspection object 50 passes through a space 15 between the transmitter 10 and the receiver 20. The inspection object 50 is, for example, a banknote, etc. Other examples of the inspection object 50 are described below.

For example, the inspection object 50 is fed by the feeder 30; and the inspection object 50 passes through the space 15. The feeder 30 is, for example, a roller, etc. Thus, the feeder 30 causes the inspection object 50 to move relative to the transmitter 10 and the receiver 20 in the space 15 between the transmitter 10 and the receiver 20. The feeder 30 causes the inspection object 50 to move along a first direction D1 in the space 15.

The first direction D1 is taken as an X-axis direction. One direction perpendicular to the X-axis direction is taken as a Z-axis direction. A direction perpendicular to the X-axis direction and the Z-axis direction is taken as a Y-axis direction.

For example, the position in the Z-axis direction of the space 15 is between the position of the transmitter 10 in the Z-axis direction and the position of the receiver 20 in the Z-axis direction.

For example, the ultrasonic wave S1 that is emitted from the transmitter 10 becomes an ultrasonic wave S2 by passing through the space 15; and the ultrasonic wave S2 is incident on the receiver 20. At least a portion of the ultrasonic wave S1 is absorbed by the inspection object 50 when the inspection object 50 passes through the space 15. The state (e.g., the intensity) of the ultrasonic wave S2 incident on the receiver 20 when the inspection object 50 passes through the space 15 is different from the state (e.g., the intensity) of the ultrasonic wave S2 incident on the receiver 20 when the inspection object 50 is not passing through the space 15.

For example, the processor 70 (which may be, for example, a controller) processes a received signal Sr1 corresponding to the ultrasonic wave (the ultrasonic wave S1 or the ultrasonic wave S2) obtained by the receiver 20.

For example, in the case where the inspection object 50 is a banknote or the like, tape or the like may be adhered to the inspection object 50 to restore damage of the banknote. The tape often is transparent. Therefore, it is difficult to detect such a foreign object by using an optical inspection. For example, it is considered that a foreign object such as tape, etc., can be detected efficiently by inspecting using an ultrasonic wave. For example, the absorption of the ultrasonic wave changes due to the foreign object such as tape, etc. The inspection device 110 according to the embodiment can inspect the foreign object of the inspection object 50.

In one example as shown in FIG. 1, the inspection object 50 includes a sheet portion 55 and a foreign object 51. The sheet portion 55 is, for example, a banknote. The foreign object 51 is, for example, transparent tape.

As shown in FIG. 1, a length Ln1 along the first direction D1 of the foreign object 51 is not more than a length Ln2 along the first direction D1 of the inspection object 50. In the example, the length Ln1 is shorter than the length Ln2.

In the embodiment, the size of the foreign object 51 may be smaller than the sizes of the transmitter 10 and the receiver 20. A size d1 of the transmitter 10 corresponds to the length along the membrane surface of a vibrating membrane (a first vibrating membrane described below) included in the transmitter 10. A size d2 of the receiver 20 corresponds to the length along the membrane surface of a vibrating membrane (a second vibrating membrane described below) included in the receiver 20.

For example, the size d1 of the transmitter 10 (the length along the membrane surface of the first vibrating membrane) is longer than the length Ln1 along the first direction D1 of the foreign object 51. For example, the size d2 of the receiver 20 (the length along the membrane surface of the second vibrating membrane) is longer than the length Ln1 along the first direction D1 of the foreign object 51.

In the embodiment, the foreign object 51 that is smaller than the size d1 of the transmitter 10 and the size d2 of the receiver 20 can be detected by the method described below.

Figure 2:
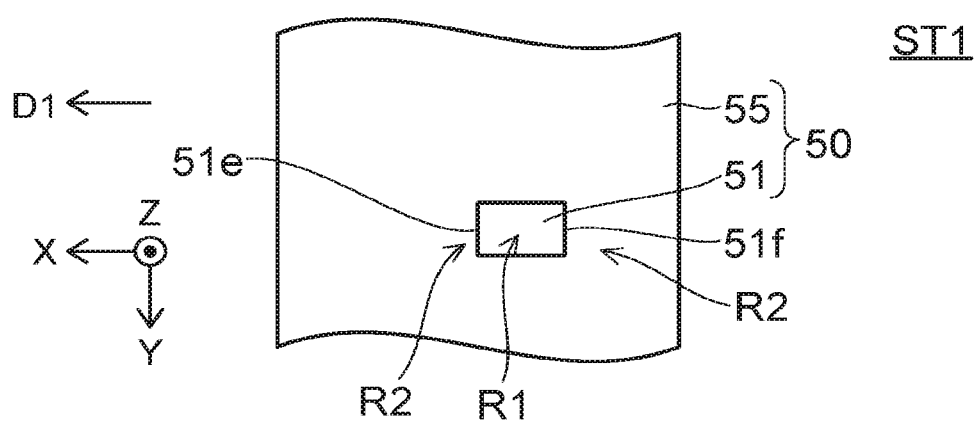
FIG. 2 is a schematic plan view illustrating the inspection object inspected by the inspection device according to the first embodiment.

FIG. 2 is a schematic plan view illustrating the inspection object inspected by the inspection device according to the first embodiment.

For the inspection object 50 in a first state ST1 as shown in FIG. 2, the foreign object 51 is provided in a portion of the inspection object 50 (the sheet portion 55). The inspection object 50 includes a first region R1 and a second region R2. For example, the direction from the first region R1 toward the second region R2 is aligned with the first direction D1. The first region R1 includes the foreign object 51. The second region R2 does not include the foreign object 51.

The boundary between the first region R1 and the second region R2 corresponds to an edge of the foreign object 51. Two edges (an edge 51e and an edge 51f) are provided in the example. In the case where the foreign object 51 (e.g., the tape) is at an edge of the inspection object 50, the number of edges of the foreign object 51 is one.

An example will now be described in the case where the inspection object 50 in such a first state ST1 is inspected.

Figure 3A:
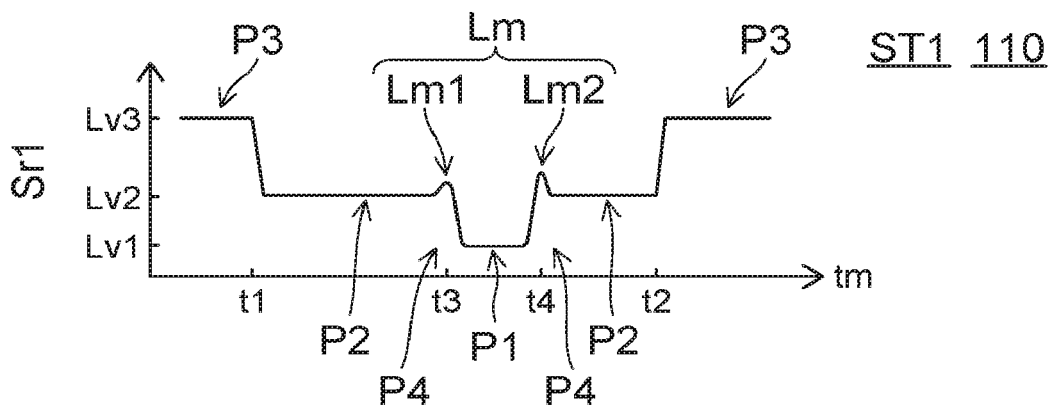
FIG. 3A and FIG. 3B are schematic views illustrating an operation of the inspection device according to the first embodiment.
Figure 3B:
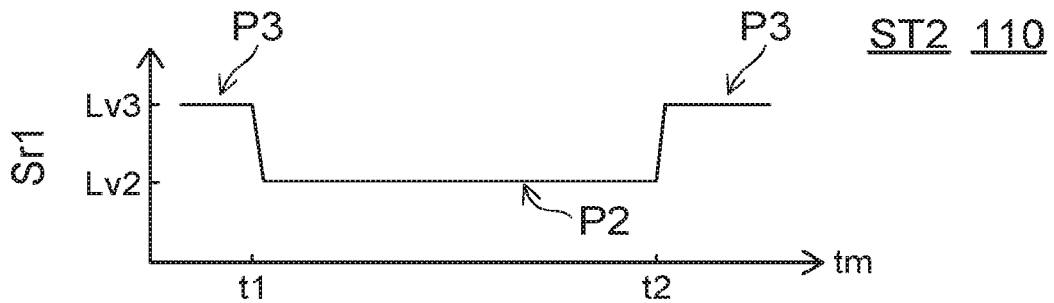

FIG. 3A and FIG. 3B are schematic views illustrating an operation of the inspection device according to the first embodiment.

These figures illustrate the received signal Sr1 obtained by the receiver 20. In these figures, the horizontal axis is a time tm. In one inspection, the movement speed of the inspection object 50 in the space 15 is constant. Accordingly, the time tm corresponds to the position along the first direction D1. In these figures, the vertical axis corresponds to the strength of the received signal Sr1.

FIG. 3A corresponds to the inspection result of the inspection object 50 in the first state ST1 recited above (the case where the foreign object 51 exists). FIG. 3B corresponds to the inspection result of the inspection object 50 in a second state ST2. The foreign object 51 is not provided in the inspection object 50 in the second state ST2.

As shown in FIG. 3A, the received signal Sr1 in the first state ST1 includes a first signal level Lv1, a second signal level Lv2, and a third signal level Lv3.

The first signal level Lv1 is the signal level in a first interval P1. In the first interval P1, at least a portion of the first region R1 passes through the space 15. For example, the first signal level Lv1 corresponds to the first region R1 including the foreign object 51.

The second signal level Lv2 is the signal level in a second interval P2. In the second interval P2, at least a portion of the second region R2 passes through the space 15. For example, the second signal level Lv2 corresponds to the second region R2 not including the foreign object 51.

The third signal level Lv3 is the signal level in a third interval P3. The inspection object 50 does not pass through the space 15 in the third interval P3. The third interval P3 is an interval before or after the inspection object 50 passes through the space 15. For example, in the case where multiple inspection objects 50 are inspected, etc., the third interval P3 is an interval between when the multiple inspection objects 50 pass through.

For example, in FIG. 3A, the interval before a first time t1 and the interval after a second time t2 correspond to the third interval P3. At least a portion of the interval after the first time t1 and before a third time t3 and at least a portion of the interval after a fourth time t4 and before the second time t2 correspond to the second interval P2. At least a portion of the interval after the third time t3 and before the fourth time t4 corresponds to the first interval P1.

As shown in FIG. 3B, the received signal Sr1 in the second state ST2 in which there is no foreign object 51 includes the second signal level Lv2 and the third signal level Lv3 recited above. The first signal level Lv1 is not generated in the second state ST2.

In the first state ST1 as shown in FIG. 3A, an extreme value Lm occurs in a fourth interval P4 between the first interval P1 and the second interval P2. In the example, a first extreme value Lm1 exists at the vicinity of the third time t3; and a second extreme value Lm2 exists at the vicinity of the fourth time t4.

For example, the edges (the edge 51e and the edge 51f) in the first direction D1 of the foreign object 51 pass through the space 15 in the fourth interval P4. For example, the one edge 51e of the foreign object 51 pass through the space 15 substantially in the third time t3. For example, the other edge 51f of the foreign object 51 passes through the space 15 substantially in the fourth time t4. It is considered that the extreme value Lm recited above occurs in the received signal Sr1 when the edge of the foreign object 51 passes through the space 15.

The processor 70 detects such an extreme value Lm. In other words, for example, the processor 70 detects at least one extreme value Lm occurring in the received signal Sr1 in the fourth interval P4 between the first interval P1 and the second interval P2. The processor 70 detects the foreign object 51 thereby. The processor 70 outputs a detection result So1 (referring to FIG. 1). For example, a designated display (light emission), sound, or the like is output based on the detection result of the foreign object.

For example, it was found that an extreme value Lm such as that recited above occurs when irradiating the ultrasonic wave S1 of appropriate conditions onto the inspection object 50 by using the transmitter 10 and the receiver 20 that are larger than the size (the length Ln1) of the foreign object 51. For example, it is considered that the extreme value Lm occurs at the edge portion of the foreign object 51 (e.g., the tape or the like) due to multiple reflection or interference of the irradiated ultrasonic wave S1. Generally, such an extreme value Lm is recognized as noise. In the embodiment, the extreme value Lm recited above that occurs uniquely is used to inspect the foreign object 51. Thereby, the foreign object 51 that is smaller than the transmitter 10 and the receiver 20 can be detected with high accuracy.

The level of the extreme value Lm (at least one of the first extreme value Lm1 or the second extreme value Lm2) is between the second signal level Lv2 and the third signal level Lv3.

For example, the absolute value of the difference between the second signal level Lv2 and the level of the extreme value Lm (at least one of the first extreme value Lm1 or the second extreme value Lm2) is not more than 0.5 times the absolute value of the difference between the third signal level Lv3 and the second signal level Lv2.

The absolute value of the third signal level Lv3 is greater than the absolute value of the second signal level Lv2. The absolute value of the second signal level Lv2 is greater than the absolute value of the first signal level Lv1.

In the embodiment, a control signal Sc from the processor 70 (referring to FIG. 1) may be supplied to the transmitter 10. The operation of the transmitter 10 may be controlled using the control signal Sc. For example, the timing of the ultrasonic wave S1 emitted from the transmitter 10 may be controlled by the processor 70. The processor 70 may perform the processing of the received signal Sr1 obtained by the receiver 20 based on the timing of the control signal Sc.

In the embodiment, the detection of the extreme value Lm may be detected using a reference sample. For example, the extreme value Lm may be detected by detecting the difference between the received signal Sr1 of the inspection object 50 in the first state ST1 and the received signal Sr1 of the inspection object 50 (the reference sample) in the second state ST2.

For example, the processor 70 may detect the extreme value based on at least a signal corresponding to the difference between the received signal Sr1 in the first state ST1 and the received signal Sr1 in the second state ST2 in which the inspection object 50 does not include the foreign object 51.

For example, a pattern, a hologram, or the like is provided in a portion of the inspection object 50 in the case where the inspection object 50 is a banknote or the like. Therefore, even in the case where a foreign object is not provided on the inspection object 50, the absorptance of the ultrasonic wave S1 may be different according to the location inside the inspection object 50. In such a case, the extreme value Lm can be detected with higher accuracy by the detection using the received signal Sr1 in the first state ST1 and the received signal Sr1 in the second state ST2.

An example of the transmitter 10 will now be described.

Figure 4:
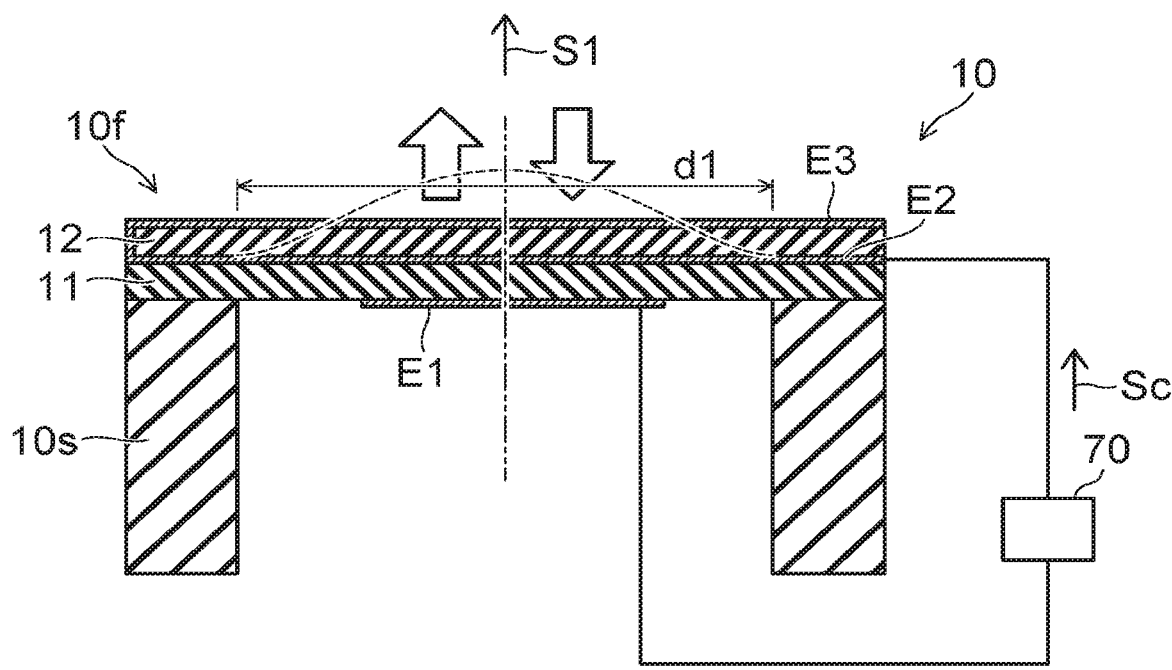
FIG. 4 is a schematic cross-sectional view illustrating a portion of the inspection device according to the first embodiment.

FIG. 4 is a schematic cross-sectional view illustrating a portion of the inspection device according to the first embodiment.

FIG. 4 illustrates the transmitter 10. As shown in FIG. 4, the transmitter 10 includes a first vibrating membrane 10$f$ (e.g., a piezoelectric transducer) and a first support member 10$s$. The first support member 10$s$ supports the first vibrating membrane 10$f$. The first vibrating membrane 10$f$ is, for example, a movable membrane. The first vibrating membrane 10$f$ includes, for example, a first piezoelectric layer 11, a second piezoelectric layer 12, a first electrode E1, a second electrode E2, and a third electrode E3. The first piezoelectric layer 11 is provided between the first electrode E1 and the third electrode E3. The second electrode E2 is provided between the first piezoelectric layer 11 and the third electrode E3. The second piezoelectric layer 12 is provided between the second electrode E2 and the third electrode E3. For example, the second electrode E2 and the third electrode E3 are electrically connected. For example, the first piezoelectric layer 11, the second piezoelectric layer 12, the second electrode E2, and the third electrode E3 include portions not overlapping the first electrode E1 in the stacking direction of the first vibrating membrane 10$f$.

For example, a voltage (which may be, for example, the control signal Sc) is applied between the first electrode E1 and the second electrode E2. Thereby, the first vibrating membrane 10$f$ vibrates. Thereby, the ultrasonic wave S1 is generated. The transmitter 10 is, for example, a piezoelectric vibrator that uses a flexing vibration. For example, the configuration of a 1-3-type composite piezoelectric body is applied to the transmitter 10.

For example, the first vibrating membrane 10$f$ includes a portion not overlapping the first support member 10$s$ in the stacking direction. The length along the membrane surface of this portion corresponds to the size d1 of the transmitter 10. The length along the membrane surface corresponds to the length along a direction perpendicular to the stacking direction.

An example of the receiver 20 will now be described.

Figure 5:
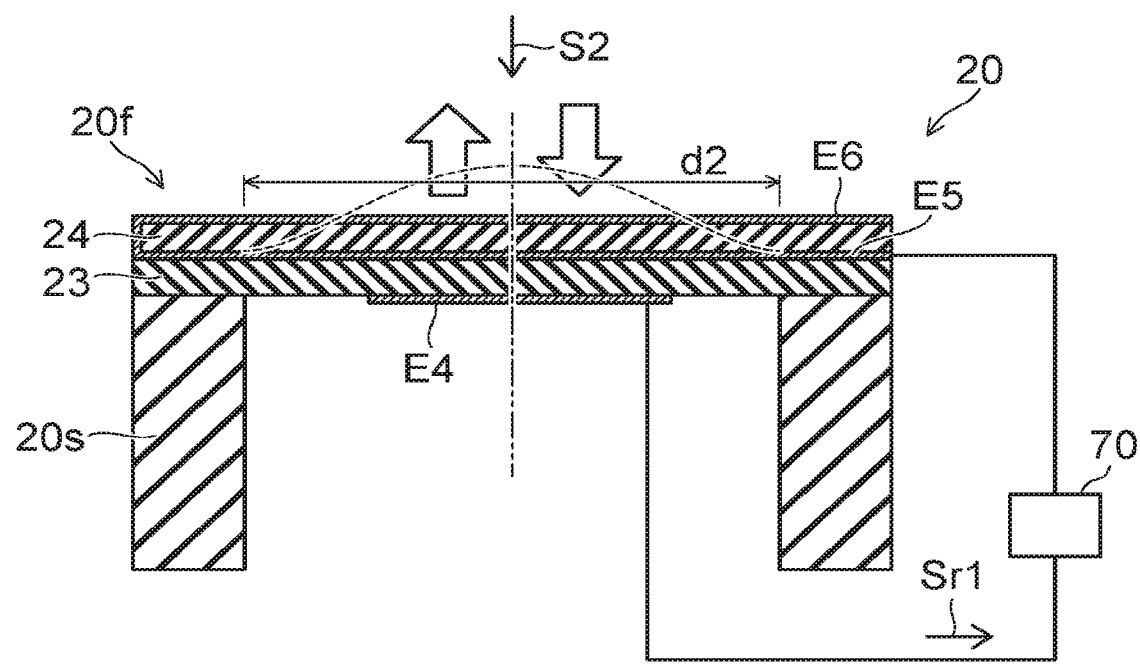
FIG. 5 is a schematic cross-sectional view illustrating a portion of the inspection device according to the first embodiment

FIG. 5 is a schematic cross-sectional view illustrating a portion of the inspection device according to the first embodiment.

FIG. 5 illustrates the receiver 20. As shown in FIG. 5, the receiver 20 includes a second vibrating membrane 20$f$ (e.g., a piezoelectric transducer) and a second support member 20$s$. The second support member 20$s$ supports the second vibrating membrane 20$f$. The second vibrating membrane 20$f$ is, for example, a movable membrane. The second vibrating membrane 20$f$ includes, for example, a third piezoelectric layer 23, a fourth piezoelectric layer 24, a fourth electrode E4, a fifth electrode E5, and a sixth electrode E6. The third piezoelectric layer 23 is provided between the fourth electrode E4 and the sixth electrode E6. The fifth electrode E5 is provided between the third piezoelectric layer 23 and the sixth electrode E6. The fourth piezoelectric layer 24 is provided between the fifth electrode E5 and the sixth electrode E6. For example, the fifth electrode E5 and the sixth electrode E6 are electrically connected. For example, the third piezoelectric layer 23, the fourth piezoelectric layer 24, the fifth electrode E5, and the sixth electrode E6 include portions not overlapping the fourth electrode E4 in the stacking direction of the second vibrating membrane 20$f$.

For example, the ultrasonic wave S1 is incident on the second vibrating membrane 20f. The second vibrating membrane 20f vibrates according to the ultrasonic wave S1. A signal that corresponds to the vibration is generated between the fourth electrode E4 and the fifth electrode E5. This signal or a signal formed by processing (e.g., amplifying) this signal corresponds to the received signal Sr1. The receiver 20 is, for example, a piezoelectric vibrator that uses the flexing vibration. For example, the configuration of a 1-3-type composite piezoelectric body is applied to the receiver 20.

For example, the second vibrating membrane 20f includes a portion not overlapping the second support member 20s in the stacking direction. The length along the membrane surface of this portion corresponds to the size d2 of the receiver 20. The length along the membrane surface corresponds to the length along a direction perpendicular to the stacking direction.

In the embodiment, a displacement meter may be used as the receiver 20. In the displacement meter, for example, the vibration of the second vibrating membrane 20f is measured as a displacement by coherent light.

In the embodiment, it is favorable for the movement direction of the inspection object 50 (the first direction D1: referring to FIG. 1) and the direction from the transmitter 10 toward the receiver 20 to be tilted from each other. In such a case, the extreme value Lm recited above is easier to obtain. For example, the feeder 30 causes the inspection object 50 to move along the first direction D1 in the space 15 (referring to FIG. 1). At this time, for example, the absolute value of the angle between the first direction D1 and the direction from the transmitter 10 toward the receiver 20 is not less than 10 degrees and not more than 80 degrees.

In the embodiment, the inspection object 50 includes at least one of a banknote, a gift certificate, a check, a security, or a card-like medium. The inspection object 50 includes paper or a resin. For example, the inspection object 50 has a sheet configuration.

In the embodiment, for example, the foreign object 51 is light-transmissive. For example, the absorptance for visible light of the foreign object 51 is lower than the absorptance for visible light of the second region R2.

In the embodiment, the transmitter 10 recited above and the receiver 20 recited above each may be multiply provided. One of the multiple transmitters 10 corresponds to one of the multiple receivers 20. One of the multiple transmitters 10 and one of the multiple receivers 20 correspond to one transceiver pair. The multiple transceiver pairs are arranged in an array configuration.

The sound wave signal (the ultrasonic wave S2) that passes through the inspection object 50 (e.g., the banknote or the like) is measured by the multiple transceiver pairs. The section where the signal strength has an extremal change is determined to be the edge portion of the foreign object 51.

For example, there are cases where tape or the like is adhered to a banknote to repair damage of the banknote, etc. Such a banknote is not suited for circulation. Therefore, a method for detecting such a foreign object 51 (the tape, etc.) by using an ultrasonic sensor element has been proposed for monitors, classification tabulators, etc., of banknotes. Generally, the size (and the shape) of the foreign object 51 that are detectable are dependent on the size of the transmission/reception surface of the ultrasonic sensor element. It is difficult to detect a foreign object 51 that is smaller than the size of the ultrasonic sensor element.

In the embodiment, the foreign object 51 is detected by detecting the extreme value Lm recited above included in the received signal Sr1. For example, the extreme value Lm is determined as the edge (the interface) of the foreign object 51. For example, the foreign object 51 that is smaller than the size of the ultrasonic sensor element can be detected.

For example, the foreign object 51 of the inspection object 50 (the paper-like sheet) that is fed at a high speed can be detected with high accuracy at a resolution that is smaller than the size of the sensor element.

For example, generally, the size of the sensor element is designed to be relatively large by considering the positional shift of the inspection object 50. In the embodiment, the detection of the foreign object 51 is possible even in the case where the size of the sensor element is large. The size of the detectable foreign object 51 can be small. In the embodiment, an inspection device can be provided in which higher accuracy is obtained.

The embodiment has applications other than the fitness determination of banknotes. The embodiment is applicable to the automatic discrimination or automatic processing of various printed matter.

Second Embodiment

The embodiment relates to an inspection method.

In the method, the ultrasonic wave S1 is emitted from the transmitter 10 toward the receiver 20; the inspection object 50 is caused to move relative to the transmitter 10 and the receiver 20 in the space 15 between the transmitter 10 and the receiver 20; and the received signal Sr1 corresponding to the ultrasonic wave S2 obtained by the receiver 20 is processed. The received signal Sr1 includes the first signal level Lv1, the second signal level Lv2, and the third signal level Lv3 in the first state ST1 in which the inspection object 50 includes the first region R1 including the foreign object 51 and the second region R2 not including the foreign object 51. The first signal level Lv1 is the signal level in the first interval P1 when at least a portion of the first region R1 passes through the space 15. The second signal level Lv2 is the signal level in the second interval P2 when at least a portion of the second region R2 passes through the space 15. The third signal level Lv3 is the signal level in the third interval P3 when the inspection object 50 does not pass through the space 15. In the processing according to the embodiment, the foreign object 51 is detected by detecting at least one extreme value Lm occurring in the received signal Sr1 in the fourth interval P4 between the first interval P1 and the second interval P2.

According to the embodiments, an inspection device and an inspection method can be provided in which higher accuracy is obtained.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in inspection devices such as transmitters, receivers, feeders, processors, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all inspection devices, and inspection methods practicable by an appropriate design modification by one skilled in the art based on the inspection devices, and inspection methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An inspection device, comprising:
a transmitter configured to emit an ultrasonic wave;
a receiver;
a feeder configured to cause an inspection object to move relative to the transmitter and the receiver in a space between the transmitter and the receiver; and
a processor configured to process a received signal corresponding to the ultrasonic wave obtained by the receiver,
in a first state in which the inspection object includes a first region and a second region, the first region includes a foreign object, and the second region does not include the foreign object, the received signal includes
a first signal level in a first interval when at least a portion of the first region passes through the space,
a second signal level in a second interval when at least a portion of the second region passes through the space, and
a third signal level in a third interval when the inspection object does not pass through the space,
the processor is configured to detect the foreign object by detecting at least one extreme value occurring in the received signal in a fourth interval between the first interval and the second interval,
wherein an absolute value of the third signal level is greater than an absolute value of the second signal level, and
the absolute value of the second signal level is greater than an absolute value of the first signal level.

2. The device according to claim 1, wherein
the feeder causes the inspection object to move along a first direction in the space, and
an edge in the first direction of the foreign object passes through the space in the fourth interval.

3. The device according to claim 1, wherein
the feeder causes the inspection object to move along a first direction in the space,
the transmitter includes a transmitting vibrating membrane, and
a length along a membrane surface of the transmitting vibrating membrane is longer than a length along the first direction of the foreign object.

4. The device according to claim 1, wherein
the feeder causes the inspection object to move along a first direction in the space,
the receiver includes a receiving vibrating membrane, and
a length along a membrane surface of the receiving vibrating membrane is longer than a length along the first direction of the foreign object.

5. The device according to claim 1, wherein
the feeder causes the inspection object to move along a first direction in the space, and
an absolute value of an angle between the first direction and a direction from the transmitter toward the receiver is not less than 10 degrees and not more than 80 degrees.

6. The device according to claim 1, wherein a level of the extreme value is between the second signal level and the third signal level.

7. The device according to claim 1, wherein the processor detects the extreme value based on at least a signal corresponding to a difference between the received signal in the first state and the received signal in a second state, the inspection object not including the foreign object in the second state.

8. The device according to claim 7, wherein the received signal in the second state includes the second signal level and the third signal level.

9. The device according to claim 1, wherein the inspection object has a sheet configuration.

10. The device according to claim 1, wherein the inspection object is a banknote.

11. The device according to claim 1, wherein an absorptance for visible light of the foreign object is lower than an absorptance for the visible light of the second region.

12. An inspection device comprising:
a transmitter configured to emit an ultrasonic wave;
a receiver;
a feeder configured to cause an inspection object to move relative to the transmitter and the receiver in a space between the transmitter and the receiver; and
a processor configured to process a received signal corresponding to the ultrasonic wave obtained by the receiver,
in a first state in which the inspection object includes a first region and a second region, the first region includes a foreign object, and the second region does not include the foreign object, the received signal includes
a first signal level in a first interval when at least a portion of the first region passes through the space,
a second signal level in a second interval when at least a portion of the second region passes through the space, and
a third signal level in a third interval when the inspection object does not pass through the space,
the processor is configured to detect the foreign object by detecting at least one extreme value occurring in the received signal in a fourth interval between the first interval and the second interval,
wherein a level of the extreme value is between the second signal level and the third signal level, and
wherein an absolute value of a difference between the level of the extreme value and the second signal level is not more than 0.5 times an absolute value of a difference between the third signal level and the second signal level.

13. An inspection method, comprising:
emitting an ultrasonic wave from a transmitter toward a receiver, causing an inspection object to move relative to the transmitter and the receiver in a space between the transmitter and the receiver, and processing a received signal corresponding to the ultrasonic wave obtained by the receiver, in a first state in which the inspection object includes a first region and a second region, the first region includes a foreign object, and the second region does not include the foreign object, the received signal includes a first signal level in a first interval when at least a portion of the first region passes through the space, a second signal level in a second interval when at least a portion of the second region passes through the space, and a third signal level in a third interval when the inspection object does not pass through the space; and detecting the foreign object by detecting at least one extreme value occurring in the received signal in a fourth interval between the first interval and the second interval, wherein an absolute value of the third signal level is greater than an absolute value of the second signal level, and the absolute value of the second signal level is greater than an absolute value of the first signal level.

* * * * *